Figure 1:
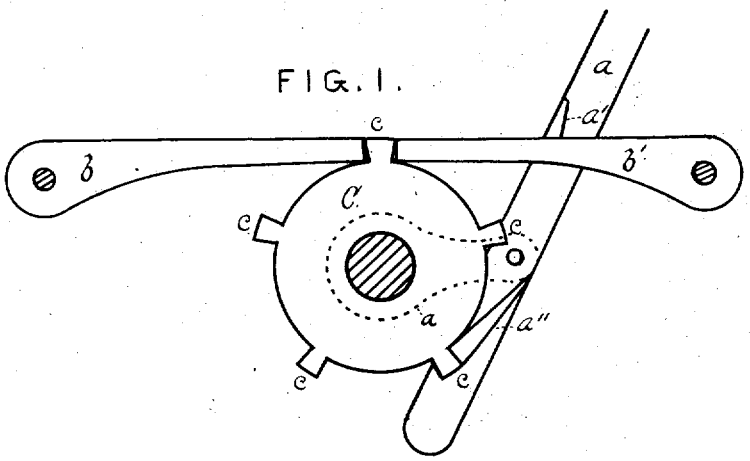

G. W. & F. P. MURPHEY.

CHECK ROWER FOR CORN PLANTERS.

No. 10,219. Reissued Oct. 24, 1882.

Witnesses.

P. D. Walker

W. J. Walker

Inventors.

George W. Murphey.

Frank P. Murphey.

By L. P. Graham atty.

N. PETERS, Photo-Lithographer, Washington, D. C.

G. W. & F. P. MURPHEY.
CHECK ROWER FOR CORN PLANTERS.
No. 10,219. Reissued Oct. 24, 1882.
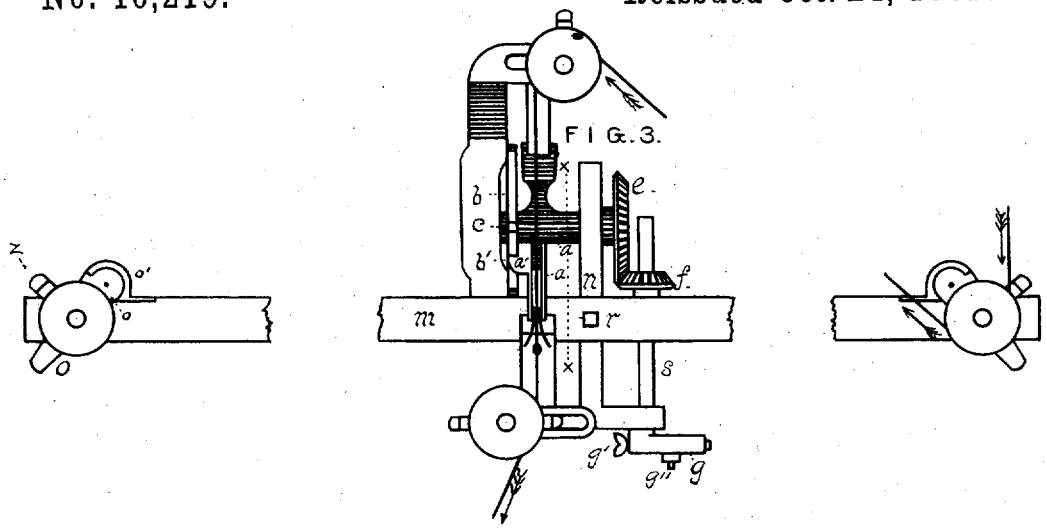
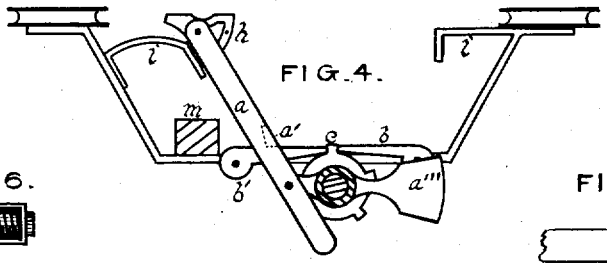
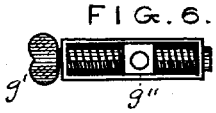
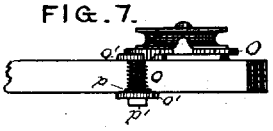
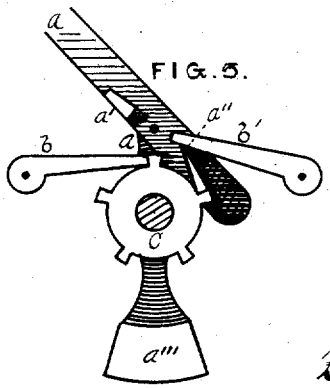
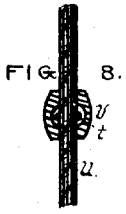
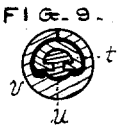
Witnesses
P. D. Walker
W. J. Walker
Inventors
George W. Murphey
Frank P. Murphey
By L. P. Graham
attorney
N. PETERS, Photo-Lithographer, Washington, D. C.

UNITED STATES PATENT OFFICE.

GEORGE W. MURPHEY AND FRANK P. MURPHEY, OF KENNEY, ILLINOIS.

CHECK-ROWER FOR CORN-PLANTERS.

SPECIFICATION forming part of Reissued Letters Patent No. 10,219, dated October 24, 1882.

Original No. 221,089, dated October 28, 1879. Application for reissue filed May 4, 1882.

*To all whom it may concern:*

Be it known that we, GEORGE W. MURPHEY and FRANK P. MURPHEY, residents of Kenney, in the county of De Witt and State of Illinois, have invented certain new and useful Improvements in Check-Rowers for Corn-Planters, of which the following is a specification.

Our invention relates to that class of check-rowers in which the dropping mechanism is operated by stops on a cord.

Our invention consists in the device used to convert reciprocating motion into intermittent rotary—namely, a ratchet-wheel on a shaft operated by a loose-jointed lever.

Our invention further consists in a locking device of peculiar construction.

Our invention further consists in a device for imparting the motion of the ratchet to the seed-slides of the planter; in a rocking catch in the arms of the lever to receive and discharge the stops on a cord; a device for regulating the strokes of the revolving arm; a tension-testing device; a device for adjusting the position of the revolving arm relative to the check-row bar, and the stop used on the cord.

In our device for converting oscillating motion into intermittent rotary the ratchet-wheel is rigid on its shaft, the lever is of the second class and has its fulcrum on the shaft of the ratchet, around which it works loosely. The lever is bifurcated to receive the cord by which it is operated, is thrown in one direction only by stops on the cord, and returns to its original position automatically. The lever is also provided with a catch that engages and operates the ratchet when thrown by the stops on the cord, and is so constructed that the catch may vary in its distance from the center of the ratchet-wheel, so that it may slide over the ratchet-teeth on the return-stroke without affecting them. In our locking device the lever above mentioned, in completing a stroke, comes in contact with a locking-pawl and makes an absolute stop. The locking-pawl engages the ratchet, being forced in close contact therewith by the lever, so that both lever and ratchet are locked by the same operation. As the ratchet revolves a secondary pawl drops behind the ratchet-teeth and prevents any back motion in the shaft.

Figure 2:
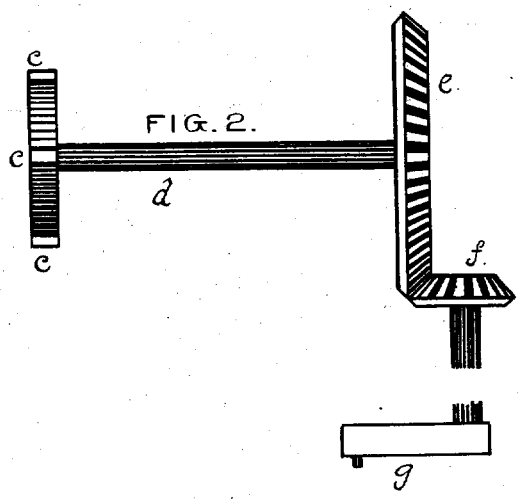

In the drawings accompanying and forming a part of this specification, Figure 1 shows our lever and ratchet just as a stroke is completed and a lock effected. Fig. 2 shows the device used to convey the motion of the ratchet to the seed-slides of the planter. Fig. 3 is a plan of our check-rower complete, with a weight used to return the lever to its place after a stroke has been made. Fig. 4 is an elevation of the lever and ratchet on the dotted line *x x* in Fig. 3, and both figures show a stroke completed. Fig. 5 is an opposite view of the lever and ratchet as shown in Fig. 4, representing the position assumed by the catch and locking-pawl before a stroke is commenced. Fig. 6 shows revolving arm in detail. Fig. 7 is the tension-testing device in elevation. Fig. 8 is a lateral section, and Fig. 9 a cross-section, of our stop.

*a a* is the lever, provided with catch *a''* and projection *a'*. *b'* is the locking-pawl, and *b* the pawl to prevent ratchet-wheel C from turning backward. *c c c* are teeth on ratchet C. *d* is a shaft to which the ratchet is rigidly attached. *e* is a gear-wheel rigid on shaft *d*. *f* is a gear-wheel operated by *e*, and by which revolving arm *g* is operated. *h* is a rocking catch in the bifurcated lever *a*, that receives and discharges the stops on the cord. *i i* are projections used to trip the rocking catch *h*. *m* is the check-row bar. *n* is the sliding arm, used to adjust the revolving arm *g* in relation to the check-row bar. *s* is a square bar, that carries arm *g* and slides through gear-wheel *f*. The arm *g* is provided with a thumb-screw, *g'*, extending through its entire length, that operates a sliding nut, *g''*, with which the seed-slide is connected. By this arrangement the stroke of the seed-slide may be lengthened or shortened.

The tension-testing device (shown in Fig. 7) consists in a shaft, *o*, provided with a tension-spring and regulated by a pawl and ratchet, *p*, and in a swinging plate mounted on said shaft, by which the pulley is supported. The stop on the cord consists in a wire, *t*, extending partly around and penetrating the cord, and in a metal stop, *v*, constructed to close around the cord over the wire.

In operation the lever is oscillated by the motion of the stops and the weight *a'''* combined, and the ratchet is revolved intermittently by the action of the catch on the lever. The ratchet and lever are locked by pawl $b'$. The motion of the rachet is conveyed to the seed-slides through the gear-wheels and revolving arm. Rocking catch $h$ receives the stops on the cord and carries them until the stroke is finished, when the projection $i$ trips said catch and discharges the stops. The revolving arm, in making a stroke, assumes a position on a line with the connecting-rod, thereby preventing any motion in the seed-slides between strokes.

We claim—

1. The herein-described device for producing intermittent rotary motion in a check-rower for corn-planters, consisting in the combination of ratchet C and loose-jointed bifurcated lever $a$, provided with catch $a''$, all substantially as herein set forth.

2. In a check-rower for corn-planters, the locking device herein described, consisting in a locking-pawl, $b'$, forming an absolute stop for both the lever $a$ and ratchet C, in combination with said ratchet and lever, whereby also the pressure of the lever on said pawl makes the ratchet lock secure, substantially as herein shown.

3. In a check-rower for corn-planters, the combination of the lever $a$, ratchet C, and gear-wheels $e$ $f$ with the arm $g$, substantially as set forth.

4. Rocking catch $h$ in the bifurcated lever $a$, in combination with trip-plates $i$ $i$, and with said lever and check-line, as and for the purpose set forth.

5. The sliding bars $s$ and $n$, adjusted in check-row bar $m$ by screw $r$, in combination with said bar $m$ and pinching-screw $r$, as and for the purpose set forth.

6. The revolving arm $g$, provided with set-screw $g'$ and projection $g''$, connected with the seed-slide of a planter, combined as herein described, to produce and regulate the throw of said slide.

7. The combination, in a device for regulating and testing the tension of the check-row cord, of plate O, with its pulley, ratchet $p$, supports $o'$ $o'$, and shaft $o$, with its tension-spring, as and for the purpose set forth.

8. In a stop for check-row cords, wire $t$ and stop $v$, in combination, as and for the purpose set forth.

9. In a planter, the pawl $b$, in combination with lever $a$, provided with the stop $a'$ and the ratchet C, as and for the purpose set forth.

GEORGE W. MURPHEY.
FRANK P. MURPHEY.

Witnesses:
JOHN F. HAMMOND,
WILLIAM B. CUNDIFF.